(12) United States Patent
Liu

(10) Patent No.: US 7,564,871 B2
(45) Date of Patent: Jul. 21, 2009

(54) NETWORK ROUTING METHOD AND SYSTEM UTILIZING LABEL-SWITCHING TRAFFIC ENGINEERING QUEUES

(75) Inventor: Chia J. Liu, Holmdel, NJ (US)

(73) Assignee: AT&T Corp., New York, NY (US)

( * ) Notice: Subject to any disclaimer, the term of this patent is extended or adjusted under 35 U.S.C. 154(b) by 836 days.

(21) Appl. No.: 10/065,511

(22) Filed: Oct. 25, 2002

(65) Prior Publication Data

US 2004/0081197 A1 Apr. 29, 2004

(51) Int. Cl.
*H04L 12/28* (2006.01)
(52) U.S. Cl. ............. 370/468; 370/395.5; 370/412
(58) Field of Classification Search ............. 370/468, 370/395.5, 352, 389, 392, 412, 413, 477
See application file for complete search history.

(56) References Cited

U.S. PATENT DOCUMENTS

| | | | |
|---|---|---|---|
| 6,628,649 B1 * | 9/2003 | Raj et al. ............. | 370/360 |
| 6,680,933 B1 * | 1/2004 | Cheesman et al. ...... | 370/352 |
| 6,973,504 B2 * | 12/2005 | Nomura ................. | 709/235 |
| 7,020,150 B2 * | 3/2006 | Ho et al. ............... | 370/412 |
| 2002/0071390 A1 * | 6/2002 | Reeves et al. .......... | 370/235 |
| 2002/0093954 A1 * | 7/2002 | Weil et al. ............. | 370/389 |
| 2004/0213242 A1 * | 10/2004 | Ando et al. ........... | 370/395.1 |

OTHER PUBLICATIONS

Multiprotocol Label Switching Architecture—IETF RFC 3031, Jan. 2001.*

* cited by examiner

*Primary Examiner*—Brian D Nguyen

(57) ABSTRACT

The present invention is directed to a scalable packet-switched network routing method and system that utilizes modified traffic engineering mechanisms to prioritize tunnel traffic and non-tunnel traffic. The method includes the steps of receiving a request to establish a traffic engineering tunnel across the packet-switched network. Then at a router traversed by the traffic engineering tunnel, a queue for packets carried inside the traffic engineering tunnel is created. Subsequently, bandwidth for the queue is reserved in accordance with the request to establish the traffic engineering tunnel, wherein the queue created for packets carried inside the traffic engineering tunnel is given priority over other traffic at the router and the reserved bandwidth for the queue can only be used by packets carried inside the traffic engineering tunnel.

18 Claims, 6 Drawing Sheets

NETWORK ROUTING METHOD AND SYSTEM UTILIZING LABEL-SWITCHING TRAFFIC ENGINEERING QUEUES

BACKGROUND OF INVENTION

The present invention relates to telecommunication networks and, more particularly, to traffic engineering in a telecommunication network.

Packet-switched networks, such as networks utilizing the TCP/IP protocol suite, typically rely on a store-and-forward paradigm and shortest-path routing protocols that do not take into account network parameters such as traffic demands and resource utilization. Traffic engineering ("TE") is directed to optimizing such performance parameters in an operational network. Recent proposals have focused on using Multiprotocol Label Switching ("MPLS") to force traffic onto specific label switched paths, thereby permitting network operators to automatically redistribute packet flows in some fashion that maximizes utilization of network resources. See, e.g., D. Awduche et al., "Requirements for Traffic Engineering Over MPLS," Internet Engineering Task Force (IETF), Network Working Group, Request for Comments (RFC) 2702, September 1999; E. Rosen et al., "Multiprotocol Label Switching Architecture," IETF Network Working Group, RFC 3031, January 2001. An MPLS TE tunnel/trunk is essentially a connection-oriented entity on top of the conventional connectionless IP network. Given a set of traffic engineering constraints, a label switched path (LSP) is determined by a constrained shortest path first (CSPF) algorithm. The explicit route output by CSPF is then dynamically setup by a signaling protocol, e.g. RSVP or CR-LDP. See D. Awduche et al., "RSVP-TE: Extensions to RSVP for LSP Tunnels," IETF Network Working Group, RFC 3209, December 2001; B. Jamoussi, ed., et al, "Constraint-Based LSP Setup using LDP," IETF Network Working Group, RFC 3212, January 2002.

Despite the potential benefits of deploying TE tunnels in IP networks, there are also concerns as well about its scalability and complexity to network operation. Moreover, at present, its admission control mechanisms are only applied at the tunnel setup time—not at the packet forwarding time. Thus, traffic inside a tunnel has to compete for the same bandwidth with traffic in another tunnel and regular IP traffic not carried by any tunnels. A group within the Internet Engineering Task Force is actively attempting to define traffic engineering in the context of what are referred to in the art as "Diff-Serv" mechanisms, to permit the enforcement of different bandwidth constraints for different classes of traffic. See F. Le Faucheur, ed., et al., "Requirements for support of Diff-Serv-aware MPLS Traffic Engineering," IETF Network Working Group, Internet Draft, draft-ietf-tewg-diff-te-reqts-05, Jun. 2002; F. Le Faucheur, ed., et al., "Protocol extensions for support of Diff-Serv-aware MPLS Traffic Engineering," IETF Network Working Group, Internet Draft, draft-ietf-tewg-diff-te-proto-01, Jun. 2002. Unfortunately, Diff-Serv aware TE would have very complicated configuration requirements and also would require separate provisioning of queues in each router. A sophisticated bandwidth broker operation support system would also be needed for DS-TE to coordinate queue bandwidth and RSVP bandwidth.

SUMMARY OF INVENTION

The present invention is directed to a novel scalable packet-switched network architecture that utilizes modified traffic engineering mechanisms to prioritize tunnel traffic vs. non-tunnel traffic. Rather than deploying traffic engineering ("TE") tunnels ubiquitously throughout a network provider's packet-switched network, a network provider limits the use of TE tunnels to a certain type of traffic—for example and without limitation, real-time traffic with articulable bandwidth constraints. In accordance with an aspect of the present invention, such traffic is policy routed into a TE tunnel and identified by a label associated with the TE tunnel. The traffic that enters the configured TE tunnel, in accordance with another aspect of the invention, receives preferential treatment from a router's queuing and congestion avoidance mechanisms. The routers traversed by the TE tunnel are configured with specialized queues created at TE tunnel setup time based on the label assigned to the tunnel. An input TE queue can be advantageously shared by TE tunnels with the same head end router. Likewise, an output TE queue can be advantageously shared by TE tunnels with the same tail end router. TE admission control mechanisms can be utilized to ensure that TE queue bandwidth allocated does not exceed the total reservable bandwidth capacity of the physical link. In essence, the intelligent traffic engineering mechanisms can be utilized, not just to limit the number of TE tunnels traversing a given link, but to ensure that bandwidth reservations are enforced not just at tunnel setup time but also honored at packet sending time—thereby enabling a novel form of quality-of-service ("QoS") routing.

Efforts such as MPLS are designed to logically separate the control plane from the data plane. The present invention, on the other hand, advantageously couples the control plane and the data plane for certain types of traffic. The present invention advantageously saves service providers the task and cost of implementing complex bandwidth broker operation support systems to associate allowed tunnel bandwidth and available queues in a packet-switched network at provisioning time. These and other advantages of the invention will be apparent to those of ordinary skill in the art by reference to the following detailed description and the accompanying drawings.

DETAILED DESCRIPTION

Figure 1:
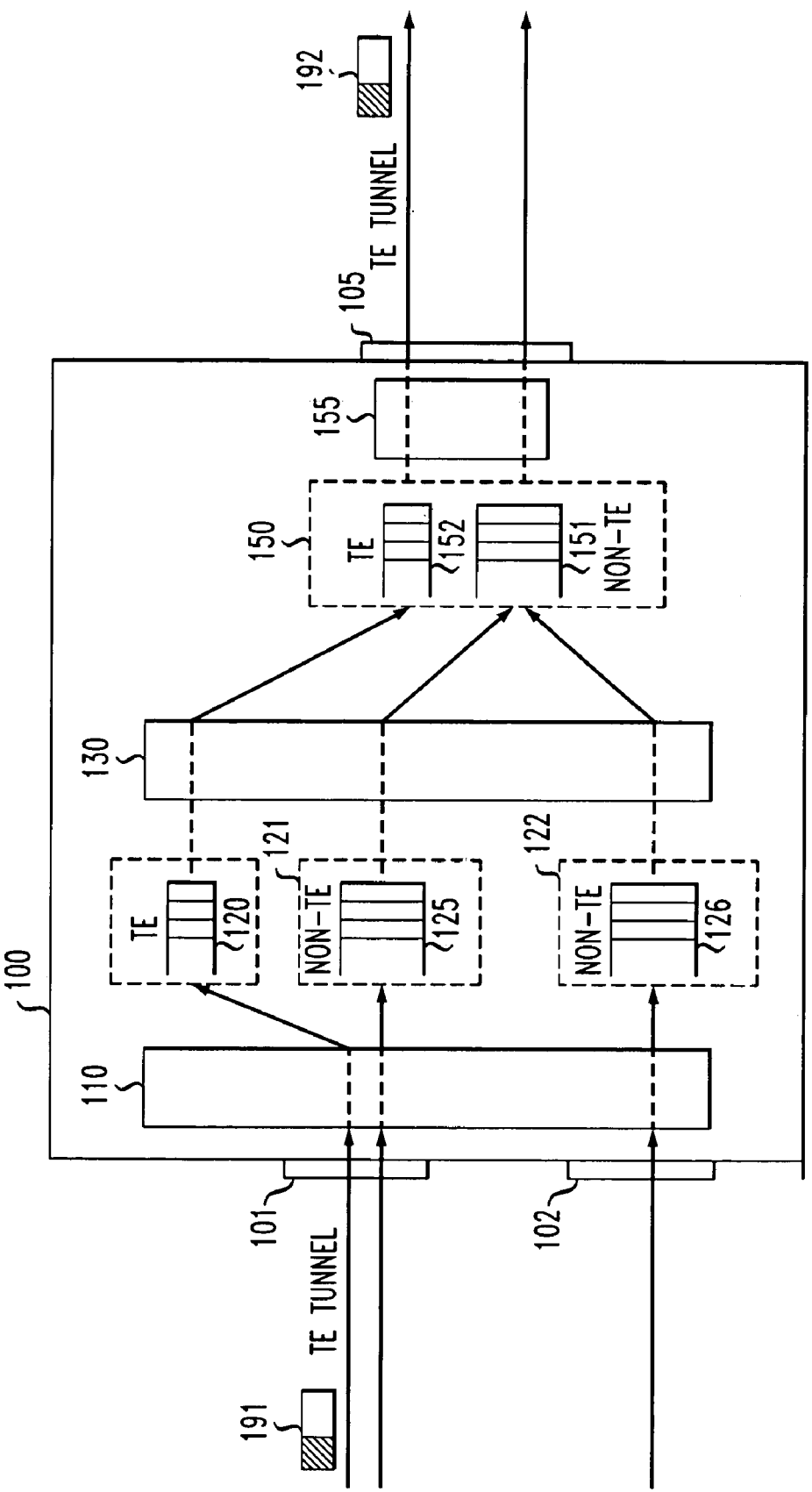
FIG. 1 is an abstract diagram of a router, configured in accordance with a preferred embodiment of the present invention.

FIG. 1 is an abstract diagram of a router 100, configured in accordance with a preferred embodiment of the present invention. The router 100 has a plurality of ports/interfaces 101, 102, 105 which connect the router 100 to other nodes; in the packet-switched network. The interfaces 101, 102, 105 can be unidirectional or bidirectional, although for simplicity of illustration, they are segregated into incoming interfaces 101, 102 on the left and outgoing interface 105 on the right of FIG. 1. The router 100 is comprised of a plurality of buffers, shown as input buffers 121, 122, and output buffer 150 in FIG. 1, which are associated with the incoming interfaces 101, 102, and the outgoing interface 105, respectively. A packet queue 125, 126, 151 is maintained at each input/output buffer which is utilized to store packets for processing using conventional known methods in the art. The router 100 also comprises packet processing modules 110, 130, and 155 which can be implemented in any of a number of ways which does not affect the nature of the invention. For example, and without limitation, the processing modules 110, 130, and 155 can be implemented as software or firmware modules executing on the same or different processors. The detailed operation of the different processing modules will be described in further detail herein.

The router 100 is assumed to be enabled to forward packets which are traversing a traffic engineering ("TE") tunnel—as well as regular packet traffic. Such TE tunnel traffic would, in the prior art, have to compete for the same bandwidth with traffic in another tunnel and regular packet traffic that is not being carried by any tunnel. Traditional TE bandwidth reservation is policed only at tunnel setup time to limit the number of tunnels traversing a given link. In accordance with a preferred embodiment of the present invention, however, the router 100 is configured to treat TE tunnel traffic with higher priority than the rest of the packets forwarded by the router 100. This preferential treatment is enabled through the creation of specialized queues for the TE tunnel traffic. As packets arrive at incoming interfaces 101 and 102, processing module 110 identifies packets which are traveling in a TE tunnel. Said packets, e.g., packet 191 in FIG. 1, are directed to a special input queue 120 which is setup specifically to handle TE tunnel traffic. Packets in the TE input queue 120 are given preferential treatment by processing module 130 in the router 100, which is responsible for making the packet-forwarding decision of which interface to use for the particular packet. Where a packet comes from the TE input queue 120, the processing module 130 will direct the packet to a special output queue 152 which is also setup to specifically handle TE tunnel traffic. Packets in the TE output queue 152 are given preferential treatment by processing module 155, which is responsible for scheduling the forwarding of packets at interface 105. The router's queuing and congestion avoidance mechanisms, as reflected in the detailed operation of processing modules 130, 155, may be readily tuned to reflect a configured bandwidth for the particular physical link utilized by the TE tunnel.

By limiting the nature of traffic traveling in a TE tunnel and effectively coupling the control plane and the data plane for the TE tunnel, the present invention advantageously permits a network service provider to configure a packet-switched network to deliver stringent quality-of-service ("QoS") required to carry real-time traffic such as voice-over-IP ("VoIP") applications.

Figure 2:
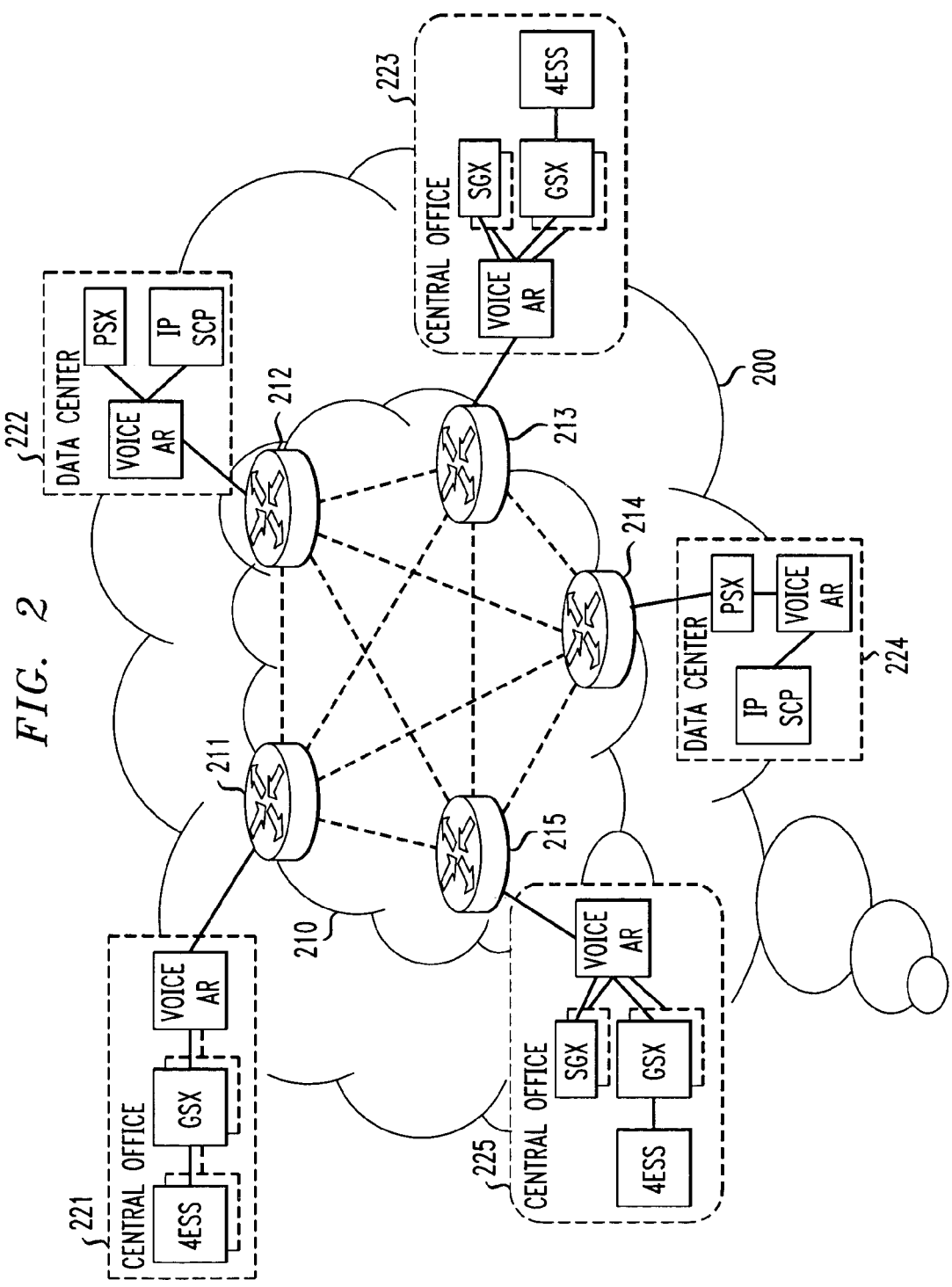
FIG. 2 is a diagram of a packet-switched backbone network, illustrating an embodiment of the present invention.

FIG. 2 illustrates such an advantageous application for the present invention. FIG. 2 is a diagram of a packet-switched network 200, such as an Internet Protocol (IP) network, which further comprises a backbone network 210 of backbone routers 211, 212, 213, 214, 215. For a large network with fully-meshed TE tunnels, the number of TE tunnels can easily reach the many thousands. Accordingly, it is advantageous to limit the tunnels to the backbone network 210 only. A typical IP backbone network comprises a number of routers, each router terminating a mixture of access, peering, and backbone links. FIG. 2 shows the backbone routers 211, . . . , 215 connecting a variety of voice access router sites—central offices 221, 223, 225 and data centers 222, 224. The backbone routers 211, . . . , 215 are connected by TE tunnels across the backbone network 210 in a full mesh. The backbone routers 211, . . . , 215 are configured to allow only real-time traffic, such as VoIP traffic or teleconference traffic, from the voice access router sites 221, . . . , 225 into the configured TE tunnels. Only the real-time traffic enters the configured TE tunnels and gets the preferential treatment by the backbone routers' queueing and congestion avoidance mechanisms. Thus, the "intelligence" enabling the QoS routing advantageously resides in the network. Note that only the routers in the backbone network 210 traversed by a TE tunnel need support traffic engineering mechanisms for the application to work. The remaining routers need not be configured for or support traffic engineering tunnels.

Figure 3:
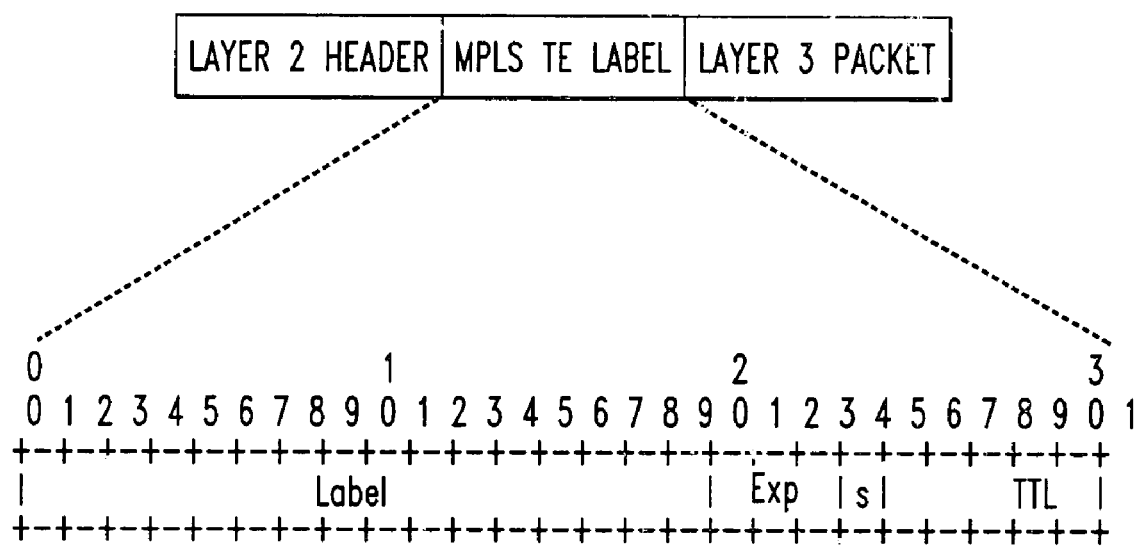
FIG. 3 sets forth an illustrative format for a traffic engineering packet label.

In order to ensure priority over non-tunnel traffic, a router must be capable of identifying a packet that is traveling in a TE tunnel. In the context of MPLS-based traffic engineering, TE tunnel traffic is identified by an MPLS label in the label stack of the packet. This is often called a "shim" header in the art. FIG. 3 sets forth an illustrative format for an MPLS TE packet label. See E. Rosen et al., "MPLS Label Stack Encoding," IETF Network Working Group, RFC 3032 (January 2001), which is incorporated by reference herein. As shown in FIG. 3, twenty bits are provided for a label value, three bits reserved for experimental use, one bit to indicate the bottom of the stack, and eight bits for a time-to-live value.

Figure 4:
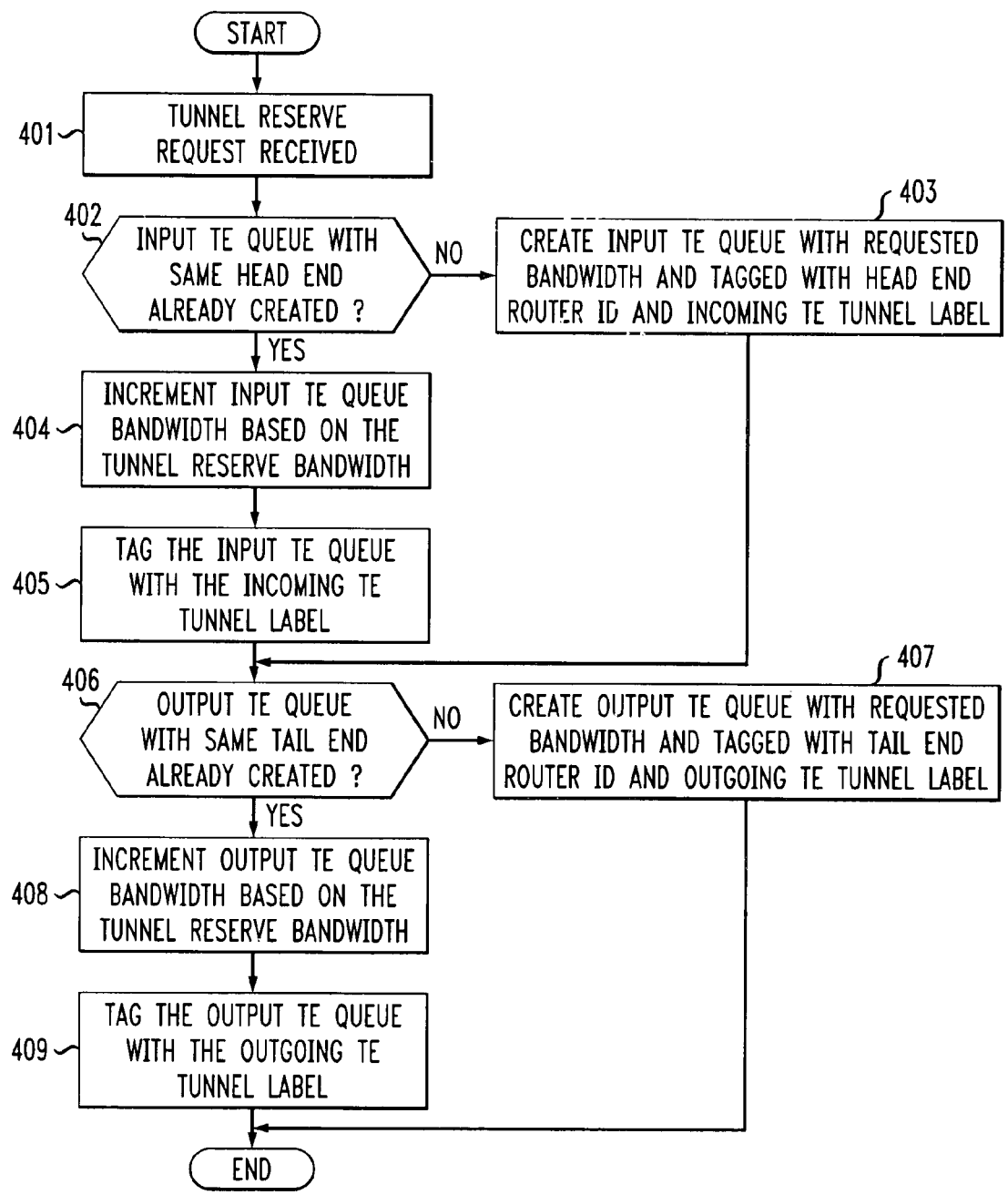
FIG. 4 is a flowchart of processing performed by a router in setting up a traffic engineering tunnel in accordance with a preferred embodiment of the present invention.

FIG. 4 is a flowchart of processing performed by a router, such as router 100 in FIG. 1, in setting up a TE tunnel in accordance with a preferred embodiment of the present invention. At step 401, a request is received to reserve resources for a new TE tunnel. For example, and without limitation, the request could be signaled to the router using a setup protocol such as the Resource ReSerVation Protocol ("RSVP"). See, e.g., R. Braden, et al., "Resource ReSerVation Protocol (RSVP)—Version 1 Functional Specification," IETF Network Working Group, RFC 2205 (September 1997); R. Braden, et al., "Resource ReSerVation Protocol (RSVP)—Version 1 Message Processing Rules," IETF Network Working Group, RFC 2209 (September 1997); D. Awduche et al., "RSVP-TE: Extensions to RSVP for LSP Tunnels," IETF Network Working Group, RFC 3209, December 2001; which are incorporated by reference herein. At step 402, the router checks whether an input TE queue with the same head end router has already been created. If not, then at step 403 a new input TE queue is created. The queue is allocated the bandwidth requested in the tunnel reservation request. The queue is also associated with the TE tunnel label and with the head end router of the TE tunnel. This can be accomplished, for example, by tagging the queue with the head end's router ID and with the incoming TE tunnel label. If an input TE queue with the same head end has already been created, at step 402, then, at step 404, the bandwidth allocated to the existing input TE queue is incremented to accommodate the bandwidth requested in the new RSVP request. Then, at step 405, the input TE queue is further associated with the new incoming TE tunnel label. The queue, in other words, is tagged with one more label, namely the incoming TE label of the tunnel. At step 406, the router checks whether an output TE queue with the same tail end router has already been created. If not, then at step 407 a new output TE queue is created. The queue is allocated the bandwidth requested in the tunnel reservation request. The queue is also associated with the TE tunnel label and with the tail end router of the TE tunnel. This can be accomplished, for example, by tagging the queue with the tail end's router ID and with the outgoing TE tunnel label. If an output TE queue with the same tail end has already been created, at step 406, then, at step 408, the bandwidth allocated to the existing output TE queue is incremented to accommodate the bandwidth requested in the new RSVP request. Then, at step 409, the output TE queue is further associated with the new outgoing TE tunnel label. The queue, in other words, is tagged with one more label, namely the outgoing TE label of the tunnel.

It should be noted that the RSVP request received above at step 401 in FIG. 4 is also processed in the control plane using conventional traffic engineering mechanisms, such as constraint-based shortest path first (CSPF) routing and bandwidth reservation mechanisms. The above-mentioned automatic TE queue creation/reservation at the data plane effectively couples the control plane and the data plane. The bandwidth reserved for the queue is configured to be the same as the configured tunnel bandwidth. TE admission control mechanisms ensure that the sum of bandwidth allocated to the TE queues should not exceed the reservable bandwidth configured for the physical link. The reserved bandwidth can only be used by the traffic carried by the TE tunnel. The present invention advantageously permits the automatic association of allowed tunnel bandwidth and available queues in the network at TE tunnel provisioning time without the cost of implementing complex bandwidth broker operation support systems.

Figure 5:
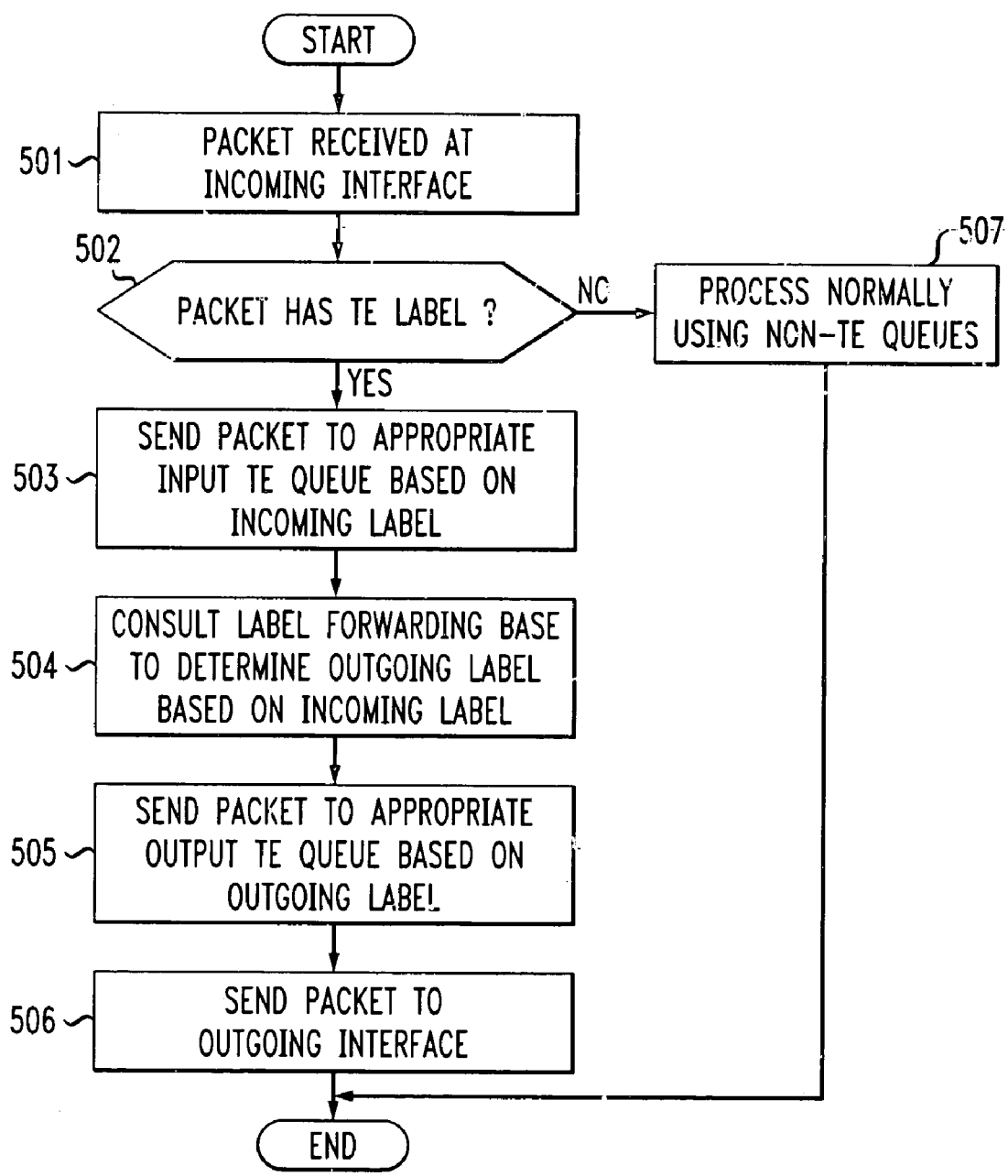
FIG. 5 is a flowchart of processing performed by a router in processing an incoming packet in accordance with a preferred embodiment of the present invention.

FIG. 5 is a flowchart of packet-forwarding processing performed by the configured router, in accordance with a preferred embodiment of the present invention. At step 501, a packet is received at an incoming interface on the router. At step 502, the label stack of the packet is checked for a TE label. The incoming TE label is used as a key to search for a TE input queue. At step 503, if a TE queue is found that is associated with the incoming TE label, then the packet is sent to the appropriate input TE queue. If not, then the packet is processed normally using a non-TE queue at step 507. As mentioned above, the forwarding of the packet with the TE label is given higher priority than the non-tunnel traffic. At step 504, the forwarding decision is made: the incoming TE label is used to lookup an outgoing TE label. The label forwarding base is consulted to determine what outgoing TE tunnel label to use for the packet based on the incoming TE label. Then, at step 505, the packet is labeled with the outgoing TE label and sent to the appropriate output TE queue based on the label. Again, as mentioned above, the packet scheduler gives priority to the packet in the output TE queue over non-tunnel traffic. Finally, at step 506, the packet is sent to the outgoing interface in accordance with the packet scheduler.

The present invention advantageously permits a network service provider to minimize the number of TE queues that a router must effectively support. In accordance with one embodiment of the invention, all TE tunnel traffic through a router can share a single TE queue in the router. That TE queue is given priority over all other queues, thereby ensuring that traffic such as real-time traffic is given preferential treatment over non-tunnel traffic. Traffic in the TE queue would be served on a first-come, first-serve basis among the real-time traffic.

A preferable embodiment that provides more granularity is to selectively share the TE queues, depending on whether the TE tunnel is from the same head end or destined for the same tail end router. All TE tunnels from the same head end router can be made to share the same input TE queue. Likewise, all TE tunnels going to the same tail end router can be made to share the same output TE queue. This embodiment, as illustrated by FIGS. 6 and 7, has the advantage that the total number of queues scales linearly with the total number of routers in the core network.

Figure 6:
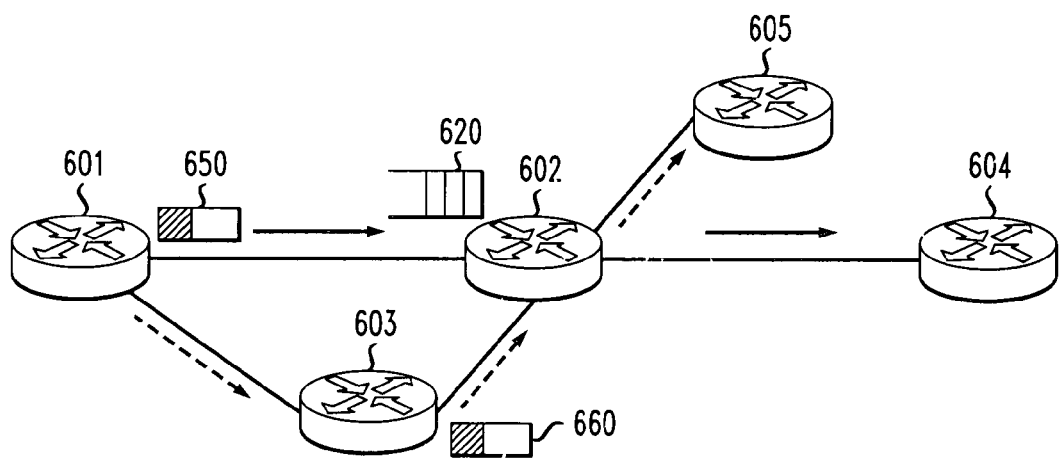
FIG. 6 is a diagram of a packet-switched network, illustrating the sharing of a traffic engineering input queue.

In FIG. 6, a diagram of a packet-switched network of routers 601, 602, 603, 604, 605 is shown, illustrating the sharing of a TE input queue. The dark arrows represent a TE tunnel with a head end router 601 and that traverses router 602. The dashed arrow represents a TE tunnel with the same head end router 601, but that traverses router 603 before traversing router 602. The two TE tunnels, for illustration purposes, have different tail end routers 605, 604. Router 602 maintains a TE input queue 620 that can be shared between the two TE tunnels. In fact, it can be advantageous to extend the statistical multiplexing at router 601 to the TE queue 620 at router 602. If the two TE tunnels have their own input queues, then the reserved queue bandwidth will be idle when no traffic is being sent down the respective tunnels. Where the head end router 601 represents a backbone router that terminates access/peering links in a backbone network, the traffic volume of, for example, a voice access router site is typically capped by the total capacity of its uplinks. Its destination can be anyone of all possible destinations. In such a situation, the bandwidth of the TE input queue shared by the TE tunnels at each router can advantageously be set to be equal to or less than the expected maximum throughput of the particular site.

Figure 7:
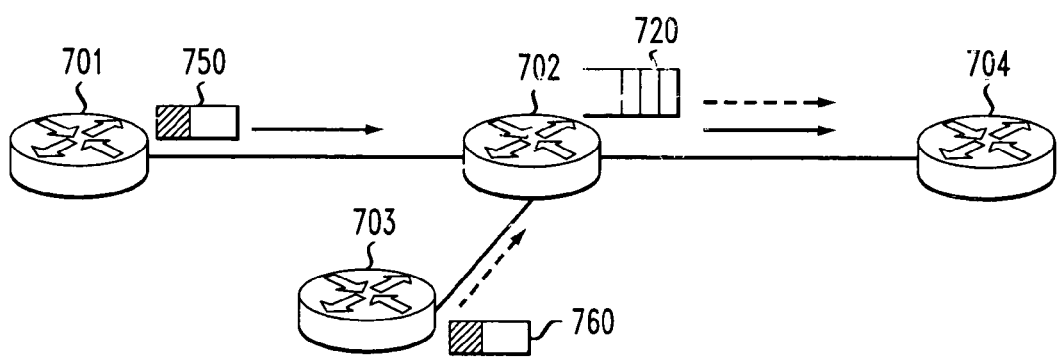
FIG. 7 is a diagram of a packet-switched network, illustrating the sharing of a traffic engineering output queue.

Similarly, in FIG. 7, a diagram of a packet-switched network of routers 701, 702, 703, 704 is shown, illustrating the sharing of a TE output queue. The dark arrows represent a TE tunnel that traverses router 702 and goes to tail end router 704. The dashed arrow represents a TE tunnel that also traverses router 702 and shares the same tail end router 704. The two TE tunnels, for illustration purposes, have different head end routers 701, 703. Router 702 maintains a TE output queue 720 that can be shared between the two TE tunnels. In fact, as above, it can be advantageous to extend the statistical multiplexing to the TE queue 720 at router 702 and permit all TE tunnels traversing the same outgoing link to share the queue. Otherwise, if the two TE tunnels have their own output queues, then the reserved queue bandwidth will be idle when no traffic is being sent down the respective tunnels.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description describes an embodiment of the invention with particular reference to RSVP and traffic engineering over MPLS. However, the principles of the present invention could be readily extended to other protocols used for traffic engineering. Such an extension could be readily implemented by one of ordinary skill in the art given the above disclosure.

The invention claimed is:

1. A method of configuring a packet-switched network comprising the steps of:
   (i) receiving a request to establish a traffic engineering tunnel across the packet-switched network;
   (ii) at a router traversed by the traffic engineering tunnel, creating a queue for packets carried inside the traffic engineering tunnel; and
   (iii) reserving a bandwidth for the queue in accordance with the request to establish the traffic engineering tunnel, wherein the queue is shared between two or more traffic engineering tunnels, wherein the queue created for packets carried inside the traffic engineering tunnel is given priority over other traffic at the router and the bandwidth for the queue can only be used by packets carried inside the traffic engineering tunnel.

2. The method of claim 1 wherein packets are identified as being carried inside the traffic engineering tunnel by a label in each of the packets and wherein the queue is associated with the label.

3. The method of claim 2 wherein the label is an MPLS TE label.

4. The method of claim 1 wherein the bandwidth for the queue comprises a sum of bandwidth reserved for each of the two or more traffic engineering tunnels.

5. The method of claim 1 wherein the queue is an input queue and wherein the queue is shared between two or more traffic engineering tunnels with a same head end router.

6. The method of claim 1 wherein the queue is an output queue and wherein the queue is shared between two or more traffic engineering tunnels with a same tail end router.

7. A method of routing packets in a packet-switched network comprising the steps of:
  (i) receiving a packet at an incoming interface of a router;
  (ii) determining whether the packet has a label identifying a traffic engineering tunnel, thereby identifying that the packet is being carried inside the traffic engineering tunnel; and
  (iii) where the packet is being carried inside the traffic engineering tunnel, sending the packet to a queue associated with the label so that the packet in the queue receives a higher priority over other traffic at the router and receives a bandwidth reserved for the queue associated with the label identifying the traffic engineering tunnel, wherein the queue is shared between two or more traffic engineering tunnels.

8. The method of claim 7 wherein the queue is associated with two or more labels identifying the two or more traffic engineering tunnels.

9. The method of claim 8 wherein the bandwidth for the queue comprises a sum of bandwidth reserved for each of the two or more traffic engineering tunnels.

10. The method of claim 8 wherein the queue is an input queue and wherein the queue is shared between two or more traffic engineering tunnels with a same head end router.

11. The method of claim 8 wherein the queue is an output queue and wherein the queue is shared between two or more traffic engineering tunnels with a same tail end router.

12. The method of claim 7 wherein the label is an MPLS TE label.

13. A router comprising:
  (i) a plurality of interfaces;
  (ii) a first processing module that sorts packets received at an interface into those packets that are carried inside a traffic engineering tunnel and those packets that are not carried inside a traffic engineering tunnel, wherein the first processing module sorts the packets at the interface by reading a label in the packet that identifies the traffic engineering tunnel;
  (iii) a first queue which receives from the first processing module only packets carried inside said traffic engineering tunnel, wherein the first queue is associated with the label identifying the traffic engineering tunnel, wherein the first queue is shared between two or more traffic engineering tunnels;
  (iv) a second queue which receives from the first processing module packets that are not carried inside said traffic engineering tunnel; and
  (v) a second processing module that receives packets from the first and second queues and gives a higher priority to packets received from the first queue.

14. The router of claim 13 wherein the second processing module processes the packets received from the first and second queues so as to ensure that a bandwidth allocated to packets in the first queue is at least as great as a reserved bandwidth for the traffic engineering tunnel.

15. The router of claim 14 wherein the reserved bandwidth for the first queue comprises a sum of bandwidth reserved for each of the two or more traffic engineering tunnels.

16. The router of claim 13 wherein the first and second queues are input queues and wherein the first queue is shared between two or more traffic engineering tunnels identified as having a same head end router.

17. The router of claim 13 wherein the first and second queues are output queues and wherein the first queue is shared between two or more traffic engineering tunnels identified as having a same tail end router.

18. The router of claim 13 wherein the label is an MPLS TE label.

* * * * *